(12) United States Patent
Sun et al.

(10) Patent No.: US 8,482,678 B2
(45) Date of Patent: Jul. 9, 2013

(54) REMOTE CONTROL AND GESTURE-BASED INPUT DEVICE

(75) Inventors: Albert C. Sun, Hsinchu (TW); Chungming Glendy Sun, Hsinchu (TW)

(73) Assignee: AFA Micro Co., Hsinchu (TW)

( * ) Notice: Subject to any disclaimer, the term of this patent is extended or adjusted under 35 U.S.C. 154(b) by 679 days.

(21) Appl. No.: 12/556,947

(22) Filed: Sep. 10, 2009

(65) Prior Publication Data

US 2011/0058107 A1 Mar. 10, 2011

(51) Int. Cl.
*H04N 5/44* (2011.01)

(52) U.S. Cl.
USPC .......................................... 348/734; 348/552

(58) Field of Classification Search
USPC .................. 348/734, 352, 552; 341/176, 173; 345/156–159; 340/825.69, 825, 72
IPC ......................................................... H04N 5/44
See application file for complete search history.

(56) References Cited

U.S. PATENT DOCUMENTS

| | | | |
|---|---|---|---|
| 5,596,656 A | 1/1997 | Goldberg | |
| 5,982,352 A | 11/1999 | Pryor | |
| 6,346,891 B1 * | 2/2002 | Feinleib et al. | 341/176 |
| 6,603,420 B1 * | 8/2003 | Lu | 341/176 |
| 6,750,801 B2 * | 6/2004 | Stefanik | 341/176 |
| 7,123,180 B1 * | 10/2006 | Daniell et al. | 341/176 |
| 7,259,756 B2 | 8/2007 | Park et al. | |
| 2009/0121894 A1 | 5/2009 | Wilson et al. | |
| 2009/0320123 A1 | 12/2009 | Yu et al. | |
| 2010/0066664 A1 | 3/2010 | Son et al. | |
| 2010/0095251 A1 | 4/2010 | Dunko | |
| 2011/0205156 A1 | 8/2011 | Gomez et al. | |

FOREIGN PATENT DOCUMENTS

EP 0661620 7/1995

OTHER PUBLICATIONS

Lam, Alan H.F., et al., MIDS: Micro Input Devices System Using MEMS Sensors, Proc. of the 2002 IEEE/RSJ, Int'l. Conf. on Itelligent Robots and Systems, Oct. 2002, 6 pages.
Allan, Roger; MEMS on the Move: Motion Sensors for the Masses; www.electronicdesign.com; ED Online ID #15656; Jun. 7, 2007; 4 pages.
Johnson, R. Colin; InvenSense spins first pitch-and-yaw MEMS gyro; www.eetimes.com; Apr. 30, 2008; 2 pages.
Layton, Julia; How Remote Controls Work; How Stuff Works; 2005; 4 pages.

* cited by examiner

*Primary Examiner* — Trang U Tran
(74) *Attorney, Agent, or Firm* — James F. Hann; Haynes Beffel & Wolfeld LLP (57) ABSTRACT

A remote control controls an audiovisual apparatus, such as a TV, using conventional physical inputs, such as buttons, or by controlled movement of the remote control. Circuitry connected to the physical inputs generates command signals for receipt by and operation of the apparatus. The command signals, such as On or Change Channel, correspond to control functions for the apparatus. The remote control also includes a motion sensor and motion circuitry connected to one another and constructed to generate at least some of the command signals when the body has been moved in predetermined manners for receipt by and operation of the apparatus. The remote control can therefore be operated using either the physical inputs or by moving the remote control in at least one of the predetermined manners. In some examples the motion sensor comprises a MEMS sensor.

20 Claims, 3 Drawing Sheets

REMOTE CONTROL AND GESTURE-BASED INPUT DEVICE

CROSS-REFERENCE TO OTHER APPLICATIONS

This application is related to U.S. patent application Ser. No. 12/337,312, filed 17 Dec. 2008, entitled HOLD-FREE GESTURE-BASED INTERFACE USING MULTIPLE SENSOR SPACES, and U.S. patent application Ser. No. 12/466,692, filed 15 May 2009, entitled LASER POINTER AND GESTURE-BASED INPUT DEVICE.

BACKGROUND OF THE INVENTION

The present invention relates to a gesture-based remote control for user-application interfaces by which audiovisual apparatus are controlled. Gesture-based remote controls can also be used for other applications, such as the use of a single remote control to control light switches, telephone answering machines, and thermostats, as well as other adaptive technology devices for persons with disabilities.

Remote controls are generally wireless devices that commonly communicate with the controlled apparatus using infrared light (IR) command signals or radio frequency (RF) command signals. The controlled apparatus includes a receiver, such as an IR light sensor or an RF receiver, adapted to receive the command signals. While both types have advantages and disadvantages, they both involve mature technology and work quite well.

Remote controls typically have a number of buttons or other physical inputs that the user presses or otherwise actuates to cause the apparatus to perform a particular function or to operate in a particular way. Some remote controls, commonly called all-in-one remote controls, are used to control a number of different apparatus, such as a television, a radio receiver and a video disc player. Other remote controls are considered universal remote controls because they can be used to control many different types or models of televisions. Because of this expanded functionality, remote controls often have many small buttons, some of which are single function buttons and some of which are multiple function buttons. While such remote controls provide a great deal of functionality, they also create a number of use problems. For example, while watching a movie being played on a video disc player, the user may wish to pause the action to answer a telephone. Unless the user is very familiar with the particular remote control, it often takes some time fumbling around with the remote control to find the proper button to push. This problem is often made more difficult because the appropriate button is often labeled using a symbol so that it may not be immediately recognized. Being pulled in two different directions at once, that is trying to pause the show and answer the phone at the same time, can cause a great amount of frustration for the user. Another difficulty of use example can arise when the user has limited use of his or her hands or is visually impaired. Even in an unstressed situation, finding the proper button to push may at best be frustrating and at worst prevent the user from taking the desired action. A further difficulty of use example can arise when the user has difficulty seeing the button, such as in low light conditions or if the user has removed his or her glasses.

SUMMARY

The present invention relates to a gesture-based remote control for user-application interfaces by which audiovisual apparatus such as a television, or an audiovisual playback device such as a digital video (DVR) recorder, a digital video disc (DVD) player, or the like, or a multimedia entertainment system, are controlled.

A first aspect of the invention is directed to a method for controlling an audiovisual apparatus using a remote control and is carried out as follows. A remote control is accessed. The remote control being of the type including physical inputs for generating a plurality of command signals for receipt by and operation of an audiovisual apparatus. The command signals comprise signals for at least one of the following commands: change volume of audiovisual work, video play forward, video fast forward, video rewind, change track of recorded audiovisual work, pause audiovisual work, record audiovisual work, turn on television, and change television channel. The remote control is moved in a chosen manner. The movement of the remote control is sensed. Whether the sensed movement corresponds to a command motion is determined. If the sensed movement corresponds to a command motion, then at least one of said command signals corresponding to said command motion is generated for receipt by and operation of the apparatus. In some examples, if the sensed movement does not correspond to a command motion, then movement of the remote control is again sensed. In some examples the remote control has a top and the remote control is at least initially oriented so that the top is generally horizontal and the top faces upwardly. In some examples the moving step is carried out by tapping the remote control. In some examples the moving step comprises sensing vibration. In some examples the moving step comprises: a first tapping sequence to the remote control with the remote control at a first location; movement of the remote control to a second location; and a second tapping sequence to the remote control with the remote control at the second location.

A second aspect of the invention is directed to a method for controlling an audiovisual apparatus and is carried out follows. A remote control is accessed, the remote control being of the type including a body having plurality of physical inputs for control of a plurality of functions of the apparatus. The plurality of functions comprise at least one of the following functions: change volume of audiovisual work, video play forward, video fast forward, video rewind, change track of recorded audiovisual work, pause audiovisual work, record audiovisual work, turn on television, and change television channel. The remote control is operated in a first mode as follows. A first input, carried by the body, is actuated. The first input corresponds to a first function of the plurality of functions of the apparatus. A first command signal corresponding to the first function is transmitted for receipt by a receiver. The remote control is operated in a second mode as follows. The remote control is moved in a chosen manner. The movement of the remote control is sensed by motion sensing circuitry carried by the body. Whether the movement corresponds to any of said plurality of functions is determined. If the movement does correspond to any of said plurality of functions, then a second command signal, corresponding to said any of said plurality of functions, is transmitted for receipt by the receiver.

A third aspect of the invention is directed to a remote control for controlling an audiovisual apparatus. The remote control comprises a body having a plurality of physical inputs. Physical input circuitry, carried by the body and connected to the physical inputs, is constructed to generate a plurality of command signals for receipt by and operation of the apparatus, the command signals corresponding to control functions for the apparatus. A motion sensor is carried by the body. Motion circuitry is carried by the body and is operably connected the motion sensor. The motion circuitry is constructed to generate at least some of said command signals when the body has been moved in predetermined manners for receipt by and operation of the apparatus. At least some of the command signals correspond to control functions for the apparatus and include at least one of the following command signals: change volume of audiovisual work, video play forward, video fast forward, video rewind, change track of recorded audiovisual work, pause audiovisual work, record audiovisual work, turn on television, and change television channel. Whereby the remote control can be operated using either the physical inputs or by moving the body in at least one of said predetermined manners. In some examples, the physical input circuitry comprises signal generation circuitry constructed to generate input signals corresponding to the physical inputs; the motion circuitry comprises motion sensitive circuitry constructed to generate at least some of said input signals; and a signal generator is connected to the signal generation circuitry and to the motion sensitive circuitry for receipt of the input signals and generation of the command signals. In some examples the body has a top, a bottom, a circumferential edge joining the top and bottom, a front end and a back end, with at least a majority of the physical inputs located at the top. In some examples the motion sensor comprises a microelectromechanical systems (MEMS) sensor.

Other aspects and advantages of the present invention are provided in the drawings, the detailed description and the claims, which follow.

DETAILED DESCRIPTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

As used herein, an audiovisual apparatus includes audiovisual entertainment devices and systems, including televisions and audiovisual playback devices such as video cassette recorders, digital video disc recorders and players, other audiovisual playback devices now known or developed in the future. Audiovisual apparatus shall all include a viewing screen for visual display of an audiovisual work and a sound generator for generating sound from the audiovisual work. Audiovisual apparatus shall not include general purpose computer systems or dedicated game computer systems.

Figure 1:
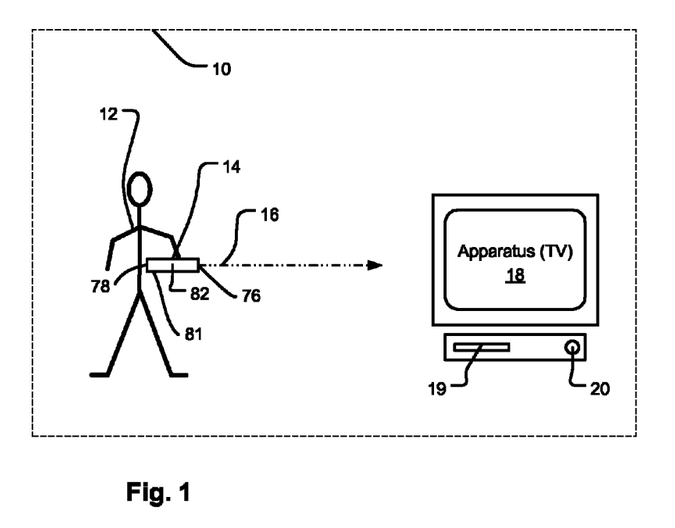
FIG. 1 is a simplified diagram of a man-machine interface based on gestures.

FIG. 1 is a simplified diagram of a user-machine interface based on gestures which are executed in an environment 10. A user 12 holds a remote control 14 which is used to produce a command signal 16 to control an audiovisual apparatus such as a television 18 through receipt of the command signal 16 by a signal receiver 20 of the television. Television 18 includes, in this example, an integral digital video disc (DVD) player 19. As discussed in more detail below, remote control 14 is constructed to produce a command signal 16 in a conventional fashion through the use of physical inputs, typically buttons 22. See also FIGS. 2 and 4. The differences between conventional remote controls and remote control 14 is that remote control 14 also includes a motion sensor 24 and motion sensitive circuitry 32 to enable command signals 16 to be generated by appropriate movements of the remote control. A single motion sensor 24 can provide input in both linear and angular acceleration space, velocity space, and displacement space, giving rich input data. This is discussed in more detail below.

For controlling television 18 or other audiovisual entertainment apparatus, the input signals 28 capable of being generated by motion sensor 24 and motion sensitive circuitry 32 will typically be used to control at least one, and typically most or all of the following conventional audiovisual functions: change volume of audiovisual work, video play forward, video fast forward, video rewind, change track of recorded audiovisual work, pause audiovisual work, record audiovisual work, turn on television, and change television channel.

Command signals 16 can be any of a variety of wireless signals, typically IR command signals or RF command signals. Different conventional or unconventional communication protocols, such as wi-fi, Bluetooth or Zigbee, may be used. Motion sensor 24 preferably include very small microelectromechanical systems (MEMS) sensors. Some embodiments may also use wired connections if desired.

Figure 4:
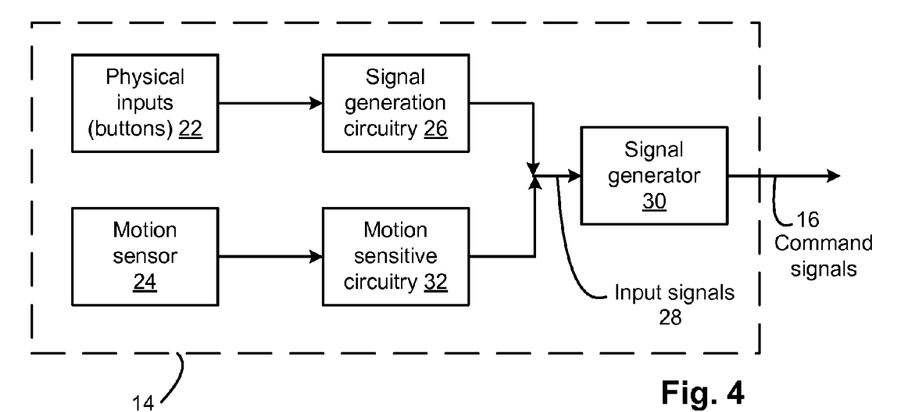
FIG. 4 is a simplified block diagram of the basic components within the remote control of FIG. 2.

Pressing or otherwise actuating a physical input 22 causes signal generation circuitry 26 to generate input signals 28 to a signal generator 30. When command signals 16 are IR command signals, signal generator 30 typically includes an LED to provide an IR command signal 16 to an infrared type of receiver 20. When command signal 16 is an RF command signal, signal generator 30 includes a radio transmitter to create the RF command signals 16. The construction of the components of remote control 14 creating command signals 16 from the actuation of physical inputs 22 can be conventional.

Upon movement of remote control 14 through a particular motion corresponding to a particular command, such as "pause", motion sensor 24 causes motion sensitive circuitry 32 to create a "pause" input signal 28 to signal generator 30. The "pause" input signal 28 from motion sensitive circuitry 32 correspond to the "pause" input signal 28 created by pressing the "pause" button 22 which causes signal generation circuitry 26 to create a "pause" input signal 28. Receipt of the, for example, "pause" signal causes signal generator 30 to create a "pause" command signal 16 for transmission to signal receiver 20 of TV 18.

In this example, remote control 14 includes a conventional on-off switch, not shown. In addition, it is preferred that remote control 14 include a remote-control-enable button or other input, not shown, used to enable the functioning of motion sensor 24 and motion sensitive circuitry 32. That is, during conventional use of remote control 14, the on-off switch is used to enable or disable the remote control. Turning remote control 14 on enables command signal 16 to be created by the use of buttons 22. However, to enable remote control 14 to create command signal 16 by the physical movement of the remote control also requires that the remotecontrol-enable button be turned on. The provision of a remote-controlled-enable button helps to prevent unintended generation of command signal 16 by simply moving remote control 14. In some examples, turning on the remote-control-enable button disables buttons 22 while in other examples, button 22 may be disabled or remain active at the option of user 12.

Representative motion sensors 24 include inertial sensors and gyroscopes capable of sensing up to 6 degrees of motion, including translation on the x-, y- and z-axes, and rotation on the x-, y- and z-axes. The motion can be interpreted by breaking down the sensor data in displacement, velocity and acceleration spaces for both translation and rotation. Many sensors, sensing many axes and types of motion, can provide substantial information to be used for generating the desired command signal 16. In addition to translational and rotational movement, motion sensors 24 preferably also have the capability of sensing vibrational movement, which is commonly primarily translational movement, such as the type generated when a user taps on remote control 14 with a finger or taps a surface with the hand holding remote control 14.

Motion sensor 24 and motion sensitive circuitry 32 may be designed to create the same set of input signals 28 as are generated by buttons 22 and signal generation circuitry 26. However, motion sensor 24 and motion sensitive circuitry 32 will typically be designed to create a subset of the input signals 28 that can be generated by buttons 22 and signal generation circuitry 26. For example, remote control 14 may have the ability to generate 36 different command signals 16 using buttons 22. However, in practice it may be desired to have remote control 14 generate only 10 or 12 of the most commonly used command signals 16.

Buttons 22, as well as other physical inputs, are typically used to control most or all of the control functions of the audiovisual entertainment apparatus 18. In some examples, apparatus 18 may be capable of receiving command signals 16 of a type that are not generated by the use of buttons 22 and signal generation circuitry 26, which we will call additional command signals 16. In such case motion sensor 24 and motion sensitive circuitry 32 may be designed to create input signals 28 that do not correspond to any input signals 28 created by buttons 22 and signal generation circuitry 26 but cause signal generator 30 to create the additional command signals 16.

For the purposes of this specification, a MEMS sensor is any one of a class of sensors consisting of a unit that is small and light enough to be attached to a remote control, and can be defined as die-level components of first-level packaging, and include accelerometers, gyroscopes, etc. Typical MEMS include an element that interacts with the environment, having a width or length on the order of 1 millimeter, and can be packaged with supporting circuitry such as an analog-to-digital converter, a signal processor and a communication port.

Representative MEMS suitable for the gesture-based remote control 14 described herein include three axis accelerometers. In some examples, two two-axis accelerometers can be used instead of a three axis accelerometer. Other representative MEMS for the gesture-based systems described herein include gyroscopes, including capacitive, piezoelectric vibrating gyroscopes.

Motion sensitive circuitry 32 comprises data processing resources which provide for interpretation of the gesture data received from motion sensor 24 located on remote control 14. The gestures are suggested in FIG. 2 and include lateral movements 70, longitudinal movements 72, rotary or circular movements 74, and up-and-down or vertical movements perpendicular to the plane of FIG. 2. The gestures can be further defined by, for example, smooth movements, short jerky movements and accelerating-to-a-stop movements. Other types of or directions of movement can also be used. Having such a library of movements, also called library of command motions, corresponding to functions of or commands to television 18 enables the user to, for example, watch a movie without worrying about finding the right keys on the remote control even if the lights are dim or switched off while the user is watching the movie.

Figure 2:
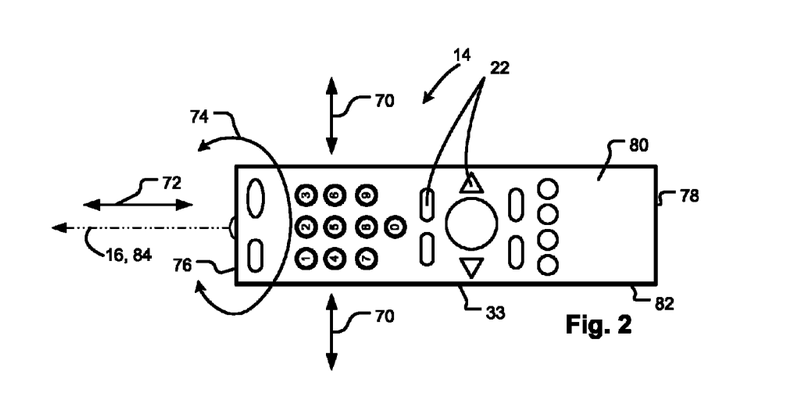
FIG. 2 is a simplified diagram of a remote control with an array of closely packed buttons.

Remote control 14 has a front end 76, a back end 78, a top or top side 80, a bottom or bottom side 81 opposite top 80, and a circumferentially extending edge 82 connecting the top and bottom. A substantial portion, and typically substantially all or all, of buttons 22 are located on top 80. Longitudinal movements 72 are typically generally along an imaginary line 84 extending between front end 76 and back end 78.

In some examples, the referenced directions, such as right, left, up and down, are defined assuming remote control 14 is held at least at the beginning of a movement in a general horizontal orientation with top 80 and buttons 22 generally horizontal and facing upwardly. The forward and backward directions are, in these examples, relative to imaginary line 84 extending between the front end 76 and back end 78 of the remote control 14 as it is used in a conventional fashion.

In some examples, motion sensitive circuitry 32 can sense up and down direction so that the remote control 14 can be held in any attitude with regard to the up and down movement. The forward and backward movements and directions, corresponding to longitudinal movements 72, in such cases can be determined with reference to the front end 76 and back end 78 of the remote control 14. The right and left lateral directions, corresponding to lateral movements 70, would be determined by the sensed up-and-down direction, the front end 76 and the back end 78 of the remote control. Other schemes for determining orientation and movements may also be used.

Motion sensitive circuitry 32 can include a map database including the specifications of gestures to be used with remote control 14, and a mapping of the gestures to specific input signals 28. For example, a pre-specified gesture in the database can be defined as a movement of remote control 14 from left side to right side which can be associated with the function of skipping ahead to the next scene in a movie. Other gestures can be pre-defined to be associated with other particular functions to be performed by apparatus 18. In some examples, the same motion can be used for different functions for different apparatus being controlled. Remote control 14 may include additional circuitry including a computer program that provides for an interactive learning process, by which the user is presented, such as on the screen of TV 18, with the specifications of a specific gesture for particular command or instruction. User 12 then makes, or tries to make, the specific gesture with remote control 14 in an attempt to generate the particular command or instruction. This provides a learning loop in which the computer enables a user to learn a library of gestures for interaction with apparatus 18.

One example of training remote control 14 to recognize a new command can proceed generally as follows. The user enters a name for the new command into computer 18. A new command gesture is performed by the user so that remote control 14 generates a new command signal 16. The user then checks computer 18 to confirm receipt of command signal 16 for the new command. Assuming computer 18 has received the command signal 16 for the new command, computer 18 generates a visual display of the new command gesture for review by the user. The user then repeats the performance of the new command and the checking of the computer until computer 18 generates and displays a composite new command gesture together with the name of the new command. Generation of the composite new command gesture indicates that the user has sufficiently consistently performed the new command gesture to enable it to be added to the library of command gestures.

An example of training a user to properly perform the gesture for an existing command can proceed generally as follows. The name for the command, such as turn on DVD player 19, is entered into computer 18. Computer 18 then displays a visual representation and a verbal description of the command. The user then performs the command gesture. Computer 18 then checks to see if the performed command gesture is sufficiently close to the programmed command gesture. If it is, the training session is complete. If not, the user once again performs the command gesture and the computer checks the command gesture; the performance and checking of the command gesture is repeated until the performed command gesture is sufficiently close to the programmed command gesture to indicate that the command gesture has been properly learned.

In some cases a user may decide to reprogram remote control 14 so that the remote control recognizes the user's command gesture as the proper command gesture for a particular command. For example, if the user has a difficult time performing the command gesture for video play forward, the user can enter a command into the computer telling the computer that the command motion in the library for video play forward is to be changed. The procedure for changing the command motion or gesture, discussed above regarding training remote control 14 to recognize a new command, can then be followed.

A system as described herein can be implemented using sensors that describe motion of the sensor in space, including providing gesture data concerning up to 6 degrees of freedom, including 3 degrees of freedom in translation in linear space provided by an accelerometer and 3 degrees of freedom provided in rotation in angular space by a gyroscope. It is also possible, theoretically, to describe the displacement of an object in space using an accelerometer for all 6 degrees of freedom, or using a gyroscope for all 6 degrees of freedom. Using multiple spaces provided by sensing function with respect to up to 6 degrees of freedom, can enable a system to distinguish between complex gestures reliably and quickly. The gesture data produced during movement of the sensors, located on the remote control, through a given gesture can be analyzed by displacement, velocity, acceleration in linear and angular spaces.

If the user rotates the remote control in space, with near constant angular speed in the time domain, then the motion will appear as a fixed spot in angular velocity space. The motion will also appear as a fixed spot at (0,0,0) in angular acceleration space, e.g. it has zero angular acceleration across a time domain.

For another example, if the user draws a linear line in space with the remote control, with constant linear speed in the time domain, then the motion will appear as a fixed spot in linear velocity space. The motion will also appear as a fixed spot at (0,0,0) on linear acceleration space, e.g. it has zero linear acceleration across time domain.

Tapping on remote control 14 causes an impulse response or vibration of the remote control, and thus motion sensor 24 will produce high-frequency oscillation or noise that can be detected separately from lower frequency motions. This impulse response or vibration caused by tapping will be collectively referred to in this application as vibration. The tapping, sometimes referred to as the tap function, can be used for a number of different purposes. For example, the tap function can be used to replace one or more movements, such as the flick movement; this can be useful for individuals having limited ability to generate certain types of movements. Examples of the tap function include the following. A single tap on top side 80 from the user's other hand can mean increase volume while a single tap on the bottom side 81 can mean decrease volume.

The tap function can also be used to input a code that had been programmed using a particular sequence of taps. For example, a double tap followed by a short pause followed by a single tap on top side 80 could be used to select a particular television channel.

Another type of tap function, sometimes called tap with location, can be particularly useful for inputting a security code or other specialized input. With the tap with location function, a first sequence of taps are performed followed by movement of remote control 14 in a predetermined manner, followed by a second sequence of taps; additional movement and tap sequences can be used. For example, to make remote control 14 operational, the following tap with location security code could be required. Tap top side 80 twice followed by a pause and tap top side 80 twice again; move remote control 14 to the right approximately 6 inches followed by three taps.

The tap function can also be used to enter different modes, such as the TV mode, or the DVD mode. In addition, the tap function can be used to enter a password. The series of taps and pauses can have a musical or rhythmic aspect to help the user remember a particular sequence of taps. The tap function can also be used to turn off the movement mode 56, see FIG. 5, so that remote control 14 no longer responds to movement. Accordingly, motion sensor 24 can respond to the vibrational movement caused by tapping remote control 14 according to (1) where the remote control is tapped, such as top side 80, bottom side 81 or along circumferential edge 82, (2) the number of taps, and (3) any particular sequence of taps with or without movement of remote control 14 between sets of taps/pauses. The tap function is therefore a type of command gesture.

A library of commands with corresponding gestures, and techniques for sensing the gestures, is provided in the following table for a television apparatus 18 that include a DVD player 19. Of course, the gestures listed can be mapped to a variety of command emotions, different from those listed in this table. All of the presentation commands can be programmable. The ability to make any command programmable is especially helpful for a person with a disability hindering or preventing him or her from consistently making a desired movement with remote control 14.

Command Motions Library

| GESTURE NUMBER | COMMAND GESTURE NAME | MAPS TO PRESENTATION COMMAND | MOTION DETECTION PROCESS |
|---|---|---|---|
| 1. | Left to Right Flick of the Remote control | Change Channel up | Motion from left to right exceeding one or both of a threshold velocity or a threshold acceleration |

-continued

Command Motions Library

| GESTURE NUMBER | COMMAND GESTURE NAME | MAPS TO PRESENTATION COMMAND | MOTION DETECTION PROCESS |
|---|---|---|---|
| 2. | Right To Left Flick | Change channel down | Motion from right to left exceeding one or both of a threshold velocity or a threshold acceleration |
| 3. | Slow Forward Movement | Zoom In | Forward motion exceeding one or both of a first threshold velocity or a first threshold acceleration and below one or both of a second threshold velocity or a second threshold acceleration |
| 4. | Slow Backward Movement | Zoom Out | Backward motion exceeding one or both of a first threshold velocity or a first threshold acceleration and below one or both of a second threshold velocity or a second threshold acceleration |
| 5. | Slow Upward (Bottom to Top) Movement | Increase Volume | Upward motion exceeding one or both of a first threshold velocity or a first threshold acceleration and below one or both of a second threshold velocity or a second threshold acceleration |
| 6. | Slow Downward (Top to Bottom) Movement | Decrease volume | Downward motion exceeding one or both of a first threshold velocity or a first threshold acceleration and below one or both of a second threshold velocity or a second threshold acceleration |
| 7. | Double Left To Right Flick | Programmable (e.g., pause or go to end) | A sequence of motion within a pre-specified time interval including from two movements from left to right, both of said two movements exceeding one or both of a threshold velocity or a threshold acceleration |
| 8. | Double Right To Left Flick | Programmable (e.g., go to beginning) | A sequence of motion within a pre-specified time interval including from two movements from right to left, both of said two movements exceeding one or both of a threshold velocity or a threshold acceleration |
| 9. | Clockwise Circle Motion | Video Play Forward | Clockwise movement, with reference to an imaginary line connecting the front end and back end of the remote control, having a radius orthogonal to the imaginary line, and exceeding one or both of a threshold velocity or a threshold acceleration |
| 10. | Counter-Clockwise Circle Motion | Video Play Backward/Rewind | Counter-clockwise movement, with reference to an imaginary line connecting the front end and back end of the remote control, having a radius orthogonal to the imaginary line, and |

-continued

| GESTURE NUMBER | COMMAND GESTURE NAME | MAPS TO PRESENTATION COMMAND | MOTION DETECTION PROCESS |
|---|---|---|---|
| | | | Command Motions Library |
| 11. | Double Clockwise Circle Motion | Turn on Television | exceeding one or both of a threshold velocity or a threshold acceleration A sequence of motion within a pre-specified time interval including two clockwise movements, with reference to an imaginary line connecting the front end and back end of the remote control, having a radius orthogonal to the imaginary line, and exceeding one or both of a threshold velocity or a threshold acceleration |
| 12. | Double Counter-Clockwise Circle Motion | Turn on DVD | A sequence of motion within a pre-specified time interval including two counter-clockwise movements with reference to an imaginary line connecting the front end and back end of the remote control, having a radius orthogonal to the imaginary line, and exceeding one or both of a threshold velocity or a threshold acceleration |
| 13. | Single tap on top side 80 | Increase volume | Vibrational movement caused by a single tap on top side 80, the vibrational movement exceeding one or both of a threshold velocity or a threshold acceleration |
| 14. | Tap with rhythm | For future expansion, such as for a password | Sequence of vibrational movements created by a series of taps with optional pauses, typically on a chosen side of the remote control, the vibrational movement for each tap exceeding one or both of a threshold velocity or a threshold acceleration |
| 15. | Tap with location | For future expansion, such as for a security code | Sets of taps/pauses with movement of remote control between sets, the vibrational movement for each tap exceeding one or both of a threshold velocity or a threshold acceleration |

Figure 3:
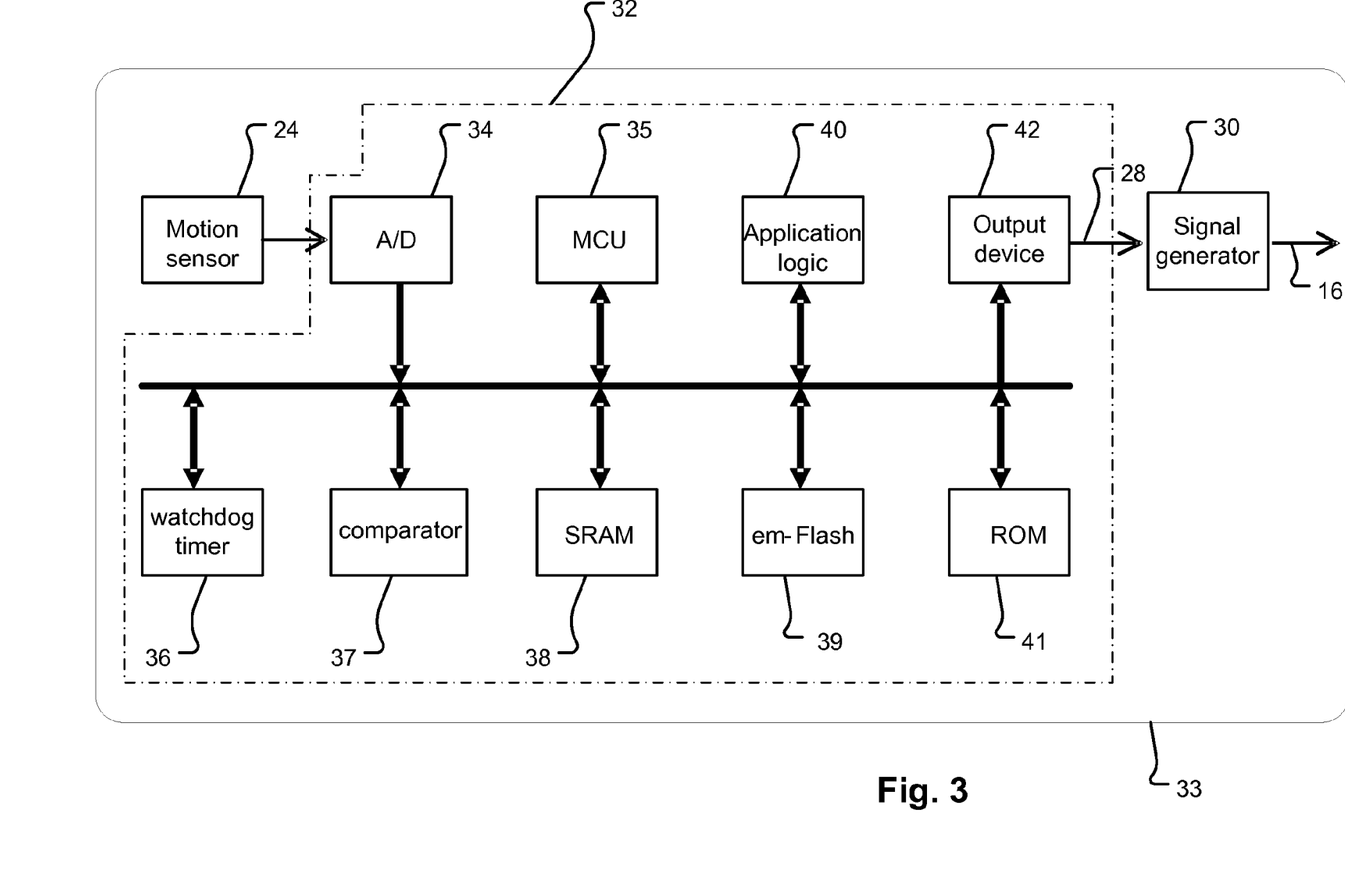
FIG. 3 is a block diagram showing the basic components constituting the motion sensitive circuitry of FIG. 4.

FIG. 3 is a block diagram of motion sensor 24, typical components of one example of motion sensitive circuitry 32, and a signal generator 30 mounted on or within body 33 of remote control 14. Motion sensor 24 is coupled to analog-to-digital conversion circuit 34. Alternative systems include more than one motion sensor 24. The conversion circuit 34 is coupled to a bus on which a microcontroller unit MCU 35 coordinates activity among a number of units, executing system firmware and coordinating processing with application logic for the gesture navigation. In the illustrated example, other units on the bus include a watchdog timer 36, comparator logic 37, for comparing input sequences of data indicating gestures or component motions of gestures that include a sequence of component motions, with stored sequences of data specifying the unique signatures for memorized gestures for component motions, SRAM 38 working memory used for example to store displacement, velocity and acceleration data for gestures as they are performed, embedded flash memory 39 to store a component motion database and application programs to support self-learning and calibration, any necessary application logic 40 to operate as glue logic or high speed logic in support of the gesture interpretation and navigation processes, in addition to that provided by the microcontroller unit, ROM memory 41 for storing instructions or other control data, and an output device 42 for providing input signals to signal generator 30. The watchdog timer 36 is operable to set time limits on the processes for interpreting gestures, to eliminate or recover from invalid commands.

Figure 5:
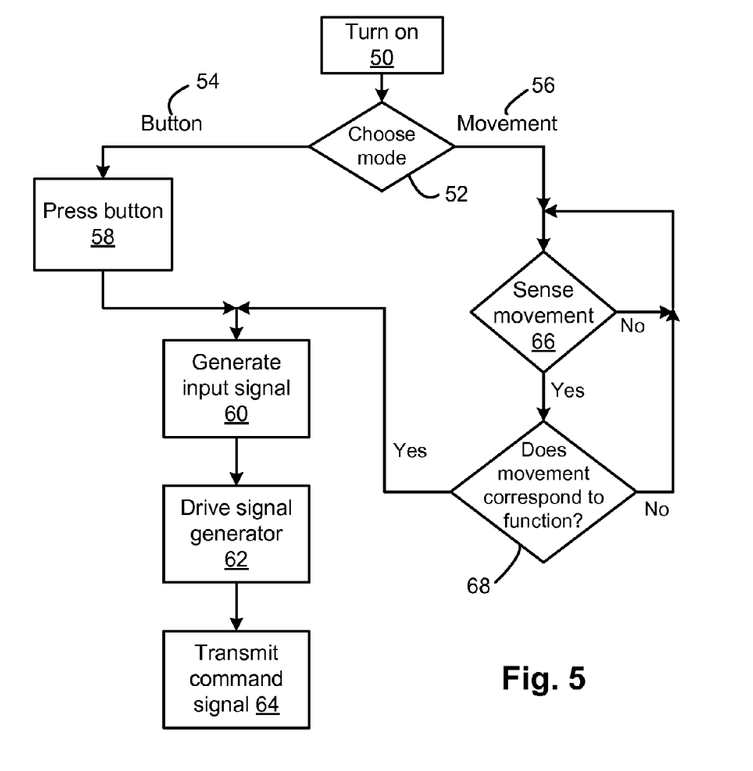
FIG. 5 provides a flow chart illustrating a method of operation for a remote control as described herein.

FIG. 5 provides a flow chart showing a simplified operation sequence for remote control 14. In this example, the user first turns on remote control 14 at 50 and, in this example, is given the option of choosing the mode at 52, that is using the physical input or button mode 54 or the movement mode 56. Assuming the button mode 54 is chosen, remote control 14 typically operates in a conventional manner and waits for the user to press or otherwise activate a physical input 22, typically by pressing button 22, as at 58. Pressing button 22 at 58 causes signal generation circuitry 26 to generate input signal 28 at 60 for driving signal generator 30 at 62. Signal generator 30 then transmits a command signal 16 to signal receiver 20 of apparatus 18 as at 64. Assuming movement mode 56 is chosen, motion sensor 24 carried by or within body 33 of remote control 14 is used to sense movement of the remote control as at 66. If movement is not sensed, control is returned to the input of sense movement 66. If the answer is yes, so that movement has been sensed, motion sensor 24 provides an appropriate signal to motion sensitive circuitry 32 which determines if the sensed movement corresponds to a predetermined function as at 68. If the answer is no, that is there is no appropriate correlation between the sensed movement and the library of command motions stored within motion sensitive circuitry 32, control is returned to the input of sense movement 66. If the answer is yes, motion sensitive circuitry 32 generates input signal 28 at 60 for driving signal generator 30 at 62. Signal generator 30 then transmits a command signal 16 to signal receiver 20 of apparatus 18 as at 64.

In the example of FIG. 4, the same signal generator 30 is used for generating command signal 16 as a result of the use of physical inputs 22 and as a result of use of motion sensor 24. In the example of FIG. 4 signal generation circuitry 26 together with signal generator 30 is sometimes referred to as physical input circuitry while motion sensitive circuitry 32 together with signal generator 30 is sometimes referred to as motion circuitry. If desired, physical input circuitry and motion circuitry could be completely separate with motion sensitive circuitry 32 using its own signal generator. In such a case, command signals 16 resulting from physical inputs 22 and motion sensor 24 could be separately generated without the use of any common circuitry.

The preferred MEMS type motion sensors 24 are ultra light and very small so that they can be easily be a part of remote control 14. This technology makes it possible to control the operation of apparatus 18 by a single gesture while holding remote control 14. Also, sophisticated gestures can be utilized through sensing displacement, velocity, acceleration in both linear and angular spaces. The system is capable of learning user-defined gestures for customized user language and commands. In some cases a series of gestures may be used to increase the number of command movements in the library of command movements.

One of the advantages of the invention is that is particularly suited for use with existing remote controls 14. The space taken up by motion sensor 24 and motion sensitive circuitry 32 may be small enough so that these additional components can be incorporated into the same body 33 of an existing remote control. Also, the invention is very suitable for use with conventional universal remote controls, which are programmed to be used with a number of different models of televisions, and all-in-one remote controls, which are typically programmed to be used with a number of different televisions, radio receivers, DVD players, and other components often associated with televisions and home theater systems. In addition, conventional remote controls can be programmed and otherwise modified for use with adaptive technologies for use by, for example, persons with disabilities to control or operate, for example, heating or cooling systems, light switches, automatic door openers, or motorized window/skylight coverings. The ability to use existing conventional remote controls and adapt or, if necessary, modify them to suit the particular adaptive technology used can significantly reduce the cost of bringing the adaptive technology to the user.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention.

Any and all patents, patent applications and printed publications referred to above are incorporated by reference.

What is claimed is:

1. A method for controlling an audiovisual apparatus using a remote control comprising:
    accessing a remote control of the type including physical inputs for generating a plurality of command signals for receipt by and operation of an audiovisual apparatus, the command signals comprising signals for at least one of the following commands: change volume of audiovisual work, video play forward, video fast forward, video rewind, change track of recorded audiovisual work, pause audiovisual work, record audiovisual work, turn on television, and change television channel;
    training the remote control by the user to recognize a plurality of command motions associated with at least some of the plurality of command signals;
    moving the remote control in a chosen manner;
    the moving step comprising tapping the remote control;
    sensing said movement of the remote control;
    determining if the sensed movement corresponds to a command motion; and
    if the sensed movement corresponds to a command motion, then generate at least one of said command signals corresponding to said command motion for receipt by and operation of the apparatus.

2. The method according to claim 1, wherein the moving step comprises tapping the remote control on a chosen side of the remote control.

3. The method according to claim 1, wherein the moving step comprises a first tapping of the remote control, pausing, followed by a second tapping of the remote control.

4. The method according to claim 1, wherein the moving step comprises:
    a first tapping sequence to the remote control with the remote control at a first location;
    movement of the remote control to a second location; and
    a second tapping sequence to the remote control with the remote control at the second location.

5. The method according to claim 4, wherein the first tapping sequence comprises at least one tap followed by a pause followed by at least one tap.

6. A method for controlling an audiovisual apparatus using a remote control comprising:
    accessing a remote control of the type including physical inputs for generating a plurality of command signals for receipt by and operation of an audiovisual apparatus, the command signals comprising signals for at least one of the following commands: change volume of audiovisual work, video play forward, video fast forward, video rewind, change track of recorded audiovisual work, pause audiovisual work, record audiovisual work, turn on television, and change television channel;

training of the remote control by the user to recognize a plurality of command motions associated with at least some of the plurality of command signals;

moving the remote control in a chosen manner;

sensing said movement of the remote control;

determining if the sensed movement corresponds to a command motion; and if the sensed movement corresponds to a command motion, then generate at least one of said command signals corresponding to said command motion for receipt by and operation of the apparatus.

7. The method according to claim 6, wherein the remote control accessing step is carried out with the remote control having physical inputs for generating all of the command signals needed to operate the audiovisual apparatus.

8. The method according to claim 6, further comprising: if the sensed movement does not correspond to a command motion, then return to the sensing movement step.

9. The method according to claim 6, wherein the remote control accessing step is carried out with a television remote control.

10. The method according to claim 6, wherein the movement sensing is carried out using a MEMS movement sensor.

11. The method according to claim 6, wherein the movement sensing step comprises sensing said movement in 3 degrees of freedom in translation in linear space and 3 degrees of freedom in rotation in angular space.

12. The method according to claim 6, wherein the moving sensing step comprises sensing vibration.

13. The method according to claim 6, further comprising training a user to move the remote control in a predetermined manner corresponding to said command motion.

14. The method according to claim 6, wherein:
remote control accessing step is carried out with the remote control having a top, a bottom, a circumferential edge joining the top and bottom, a front end and a back end, at least a majority of the physical inputs located at the top; and
the remote control moving step comprises initially orienting the remote control so that the top is generally horizontal with the top facing upwardly.

15. The method according to claim 14, wherein said command motion for a change television channel up command signal comprises motion of the remote control from left to right, the left to right motion exceeding one or both of a threshold velocity or a threshold acceleration.

16. The method according to claim 14, wherein said command motion for a zoom in command signal comprises forward motion of the remote control, the forward motion exceeding one or both of a first threshold velocity or a first threshold acceleration and below one or both of a second threshold velocity or a second threshold acceleration.

17. The method according to claim 14, wherein said command motion for an increase audiovisual work volume command signal comprises upward motion of the remote control, the upward motion exceeding one or both of a first threshold velocity or a first threshold acceleration and below one or both of a second threshold velocity or a second threshold acceleration.

18. The method according to claim 14, wherein said command motion for a turn on television command signal comprises a sequence of motions of the remote control within a pre-specified time interval, the sequence of motions including two clockwise movements, with reference to an imaginary line connecting the front end and back end of the remote control, having a radius orthogonal to the imaginary line, said motions exceeding one or both of a threshold velocity or a threshold acceleration.

19. A method for controlling an audiovisual apparatus using a remote control comprising:
accessing a remote control of the type including physical inputs for generating a plurality of command signals for receipt by and operation of an audiovisual apparatus, the command signals comprising signals for at least one of the following commands: change volume of audiovisual work, video play forward, video fast forward, video rewind, change track of recorded audiovisual work, pause audiovisual work, record audiovisual work, turn on television, and change television channel;
training the remote control by the user to recognize a plurality of command motions associated with at least some of the plurality of command signals;
moving the remote control in a chosen manner;
sensing said movement of the remote control;
determining if the sensed movement corresponds to a command motion;
if the sensed movement corresponds to a command motion, then generate at least one of said command signals corresponding to said command motion for receipt by and operation of the apparatus; and
said command motion for a chosen signal being (1) more than one or both of a first threshold velocity or a first threshold acceleration, and (2) less than one or both of a second threshold velocity or a second threshold acceleration.

20. A method for controlling an audiovisual apparatus using a remote control comprising:
accessing a remote control of the type including physical inputs for generating a plurality of command signals for receipt by and operation of an audiovisual apparatus, the command signals comprising signals for at least one of the following commands: change volume of audiovisual work, video play forward, video fast forward, video rewind, change track of recorded audiovisual work, pause audiovisual work, record audiovisual work, turn on television, and change television channel;
training of the remote control by the user to recognize a plurality of command motions associated with at least some of the plurality of command signals;
moving the remote control in a chosen manner;
the moving step comprising tapping the remote control;
sensing said movement of the remote control;
determining if the sensed movement corresponds to a command motion;
if the sensed movement corresponds to a command motion, then generate at least one of said command signals corresponding to said command motion for receipt by and operation of the apparatus; and
said command motion for a chosen signal being (1) more than one or both of a first threshold velocity or a first threshold acceleration, and (2) less than one or both of a second threshold velocity or a second threshold acceleration.

* * * * *